(12) United States Patent
Christenson et al.

(10) Patent No.: US 10,748,566 B2
(45) Date of Patent: *Aug. 18, 2020

(54) DISK DRIVE HEAD SUSPENSION STRUCTURES HAVING IMPROVED GOLD-DIELECTRIC JOINT RELIABILITY

(71) Applicant: Hutchinson Technology Incorporated, Hutchinson, MN (US)

(72) Inventors: Michael C. Christenson, St. Louis Park, MN (US); David M. Groschen, Eau Claire, WI (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,898

(22) Filed: May 13, 2019

(65) Prior Publication Data

US 2019/0267030 A1 Aug. 29, 2019

Related U.S. Application Data

(60) Continuation of application No. 15/980,649, filed on May 15, 2018, now Pat. No. 10,290,313, which is a (Continued)

(51) Int. Cl.
  *G11B 21/16* (2006.01)
  *G11B 5/48* (2006.01)
  *G11B 5/31* (2006.01)

(52) U.S. Cl.
  CPC ............ *G11B 5/486* (2013.01); *G11B 5/3163* (2013.01); *Y10T 29/49025* (2015.01)

(58) Field of Classification Search
  None
  See application file for complete search history.

(56) References Cited

U.S. PATENT DOCUMENTS

| 3,320,556 A | 5/1967 | Schneider |
| 3,582,575 A | 6/1971 | Scofield |

(Continued)

FOREIGN PATENT DOCUMENTS

| CN | 1697025 A | 11/2005 |
| CN | 102348325 A | 2/2012 |

(Continued)

OTHER PUBLICATIONS

Office Action in Chinese Patent Application No. 201680038786.3 dated Mar. 1, 2019.

(Continued)

*Primary Examiner* — Craig A. Renner
(74) *Attorney, Agent, or Firm* — DLA Piper LLP (US)

(57) ABSTRACT

A disk drive head suspension or flexure and method of manufacture. Embodiments include a portion such as a terminal pad or flying lead comprising a base layer, a dielectric layer on the base layer, a conductor layer, a seed layer between the dielectric layer and the conductor layer, and a noncorrosive metal layer on the seed layer side of the conductor layer. The seed layer has a strip that extends beyond the edge of the dielectric layer. The noncorrosive metal layer extends over the strip of the seed layer and into contact with the edge of the dielectric layer.

9 Claims, 6 Drawing Sheets

Related U.S. Application Data continuation of application No. 15/676,698, filed on Aug. 14, 2017, now Pat. No. 9,984,708, which is a division of application No. 15/189,424, filed on Jun. 22, 2016, now Pat. No. 9,734,852.

(60) Provisional application No. 62/186,721, filed on Jun. 30, 2015.

(56) References Cited

U.S. PATENT DOCUMENTS

| | | | |
|---|---|---|---|
| 3,862,522 | A | 1/1975 | Mednick |
| 3,877,120 | A | 4/1975 | Okamoto et al. |
| 3,910,339 | A | 10/1975 | Kramer |
| 4,014,257 | A | 3/1977 | Bettenhausen |
| 4,168,214 | A | 9/1979 | Fletcher et al. |
| 4,181,554 | A | 1/1980 | Rich |
| 4,299,130 | A | 11/1981 | Koneval |
| 4,418,239 | A | 11/1983 | Larson et al. |
| 4,422,906 | A | 12/1983 | Kobayashi |
| 4,659,438 | A | 4/1987 | Kuhn et al. |
| 4,670,804 | A | 6/1987 | Kant et al. |
| 4,916,798 | A | 4/1990 | Ballast |
| 5,140,288 | A | 8/1992 | Grunwell |
| D332,181 | S | 1/1993 | Sacco et al. |
| 5,189,779 | A | 3/1993 | Fishel et al. |
| 5,212,847 | A | 5/1993 | Melcher et al. |
| 5,267,572 | A | 12/1993 | Bucalo |
| 5,275,076 | A | 1/1994 | Greenwalt |
| 5,320,272 | A | 6/1994 | Melton et al. |
| 5,321,568 | A | 6/1994 | Hatam-Tabrizi |
| 5,333,085 | A | 7/1994 | Prentice et al. |
| D356,694 | S | 3/1995 | Armbrecht |
| 5,427,848 | A | 6/1995 | Baer et al. |
| 5,459,921 | A | 10/1995 | Hudson et al. |
| 5,485,053 | A | 1/1996 | Baz |
| 5,491,597 | A | 2/1996 | Bennin et al. |
| 5,521,778 | A | 5/1996 | Boutaghou et al. |
| 5,526,208 | A | 6/1996 | Hatch et al. |
| 5,598,307 | A | 1/1997 | Bennin |
| 5,608,590 | A | 3/1997 | Ziegler et al. |
| 5,608,591 | A | 3/1997 | Klaassen et al. |
| 5,631,786 | A | 5/1997 | Erpelding |
| 5,636,089 | A | 6/1997 | Jurgenson et al. |
| 5,651,723 | A | 7/1997 | Bjornard et al. |
| 5,657,186 | A | 8/1997 | Kudo et al. |
| 5,657,188 | A | 8/1997 | Jurgenson et al. |
| 5,666,241 | A | 9/1997 | Summers |
| 5,666,717 | A | 9/1997 | Matsumoto et al. |
| 5,694,270 | A | 12/1997 | Sone et al. |
| 5,712,749 | A | 1/1998 | Gustafson |
| 5,714,444 | A | 2/1998 | Yokouchi et al. |
| 5,717,547 | A | 2/1998 | Young |
| 5,722,142 | A | 3/1998 | Myers |
| 5,734,526 | A | 3/1998 | Symons |
| 5,737,152 | A | 4/1998 | Balakrishnan |
| 5,754,368 | A | 5/1998 | Shiraishi et al. |
| 5,764,444 | A | 6/1998 | Imamura et al. |
| 5,773,889 | A | 6/1998 | Love et al. |
| 5,790,347 | A | 8/1998 | Girard |
| 5,795,435 | A | 8/1998 | Waters, Jr. |
| 5,796,552 | A | 8/1998 | Akin, Jr. et al. |
| 5,805,382 | A | 9/1998 | Lee et al. |
| 5,805,653 | A | 9/1998 | Hettiarachchi et al. |
| 5,812,344 | A | 9/1998 | Balakrishnan |
| 5,818,662 | A | 10/1998 | Shum |
| 5,857,257 | A | 1/1999 | Inaba |
| 5,862,010 | A | 1/1999 | Simmons et al. |
| 5,862,015 | A | 1/1999 | Evans et al. |
| 5,889,137 | A | 3/1999 | Hutchings et al. |
| 5,892,637 | A | 4/1999 | Brooks, Jr. et al. |
| 5,893,201 | A | 4/1999 | Myers |
| 5,898,541 | A | 4/1999 | Boutaghou et al. |
| 5,898,544 | A | 4/1999 | Krinke et al. |
| D411,377 | S | 6/1999 | Sacco et al. |
| 5,914,834 | A | 6/1999 | Gustafson |
| 5,921,131 | A | 7/1999 | Stange |
| 5,922,000 | A | 7/1999 | Chodorow |
| 5,924,187 | A | 7/1999 | Matz |
| 5,929,390 | A | 7/1999 | Naito et al. |
| 5,956,212 | A | 9/1999 | Zhu |
| 5,973,882 | A | 10/1999 | Tangren |
| 5,973,884 | A | 10/1999 | Hagen |
| 5,986,853 | A | 11/1999 | Simmons et al. |
| 5,995,328 | A | 11/1999 | Balakrishnan |
| 5,995,329 | A | 11/1999 | Shiraishi et al. |
| 6,011,671 | A | 1/2000 | Masse et al. |
| 6,014,289 | A | 1/2000 | Goss |
| 6,029,334 | A | 2/2000 | Hartley |
| 6,038,102 | A | 3/2000 | Balakrishnan et al. |
| 6,046,887 | A | 4/2000 | Uozumi et al. |
| 6,055,132 | A | 4/2000 | Arya et al. |
| 6,063,228 | A | 5/2000 | Sasaki et al. |
| 6,075,676 | A | 6/2000 | Hiraoka et al. |
| 6,078,470 | A | 6/2000 | Danielson et al. |
| 6,080,173 | A | 6/2000 | Williamson et al. |
| 6,085,456 | A | 7/2000 | Battaglia |
| 6,095,023 | A | 8/2000 | Harada et al. |
| 6,108,175 | A | 8/2000 | Hawwa et al. |
| 6,115,221 | A | 9/2000 | Utsunomiya |
| 6,118,637 | A | 9/2000 | Wright et al. |
| 6,144,531 | A | 11/2000 | Sawai |
| 6,146,813 | A | 11/2000 | Girard et al. |
| 6,156,982 | A | 12/2000 | Dawson |
| 6,157,522 | A | 12/2000 | Murphy et al. |
| 6,172,853 | B1 | 1/2001 | Davis et al. |
| 6,180,999 | B1 | 1/2001 | Abbott |
| 6,181,520 | B1 | 1/2001 | Fukuda |
| 6,190,939 | B1 | 2/2001 | Burns |
| 6,194,777 | B1 | 2/2001 | Abbott et al. |
| 6,195,227 | B1 | 2/2001 | Fan et al. |
| 6,207,298 | B1 | 3/2001 | Fukui |
| D440,062 | S | 4/2001 | Tsay |
| 6,215,175 | B1 | 4/2001 | Kinsman |
| 6,215,622 | B1 | 4/2001 | Ruiz et al. |
| 6,215,629 | B1 | 4/2001 | Kant et al. |
| 6,218,727 | B1 | 4/2001 | Merkl et al. |
| 6,225,684 | B1 | 5/2001 | Stitt, II et al. |
| 6,225,701 | B1 | 5/2001 | Hori et al. |
| 6,229,673 | B1 | 5/2001 | Shinohara et al. |
| 6,233,124 | B1 | 5/2001 | Budde et al. |
| 6,236,109 | B1 | 5/2001 | Hsuan et al. |
| 6,239,953 | B1 | 5/2001 | Mei |
| 6,245,448 | B1 | 6/2001 | Abbott |
| 6,246,546 | B1 | 6/2001 | Tangren |
| 6,246,552 | B1 | 6/2001 | Soeno et al. |
| 6,249,404 | B1 | 6/2001 | Doundakov et al. |
| 6,255,723 | B1 | 7/2001 | Light et al. |
| 6,262,868 | B1 | 7/2001 | Arya et al. |
| 6,275,358 | B1 | 8/2001 | Balakrishnan et al. |
| 6,278,587 | B1 | 8/2001 | Mei |
| 6,282,062 | B1 | 8/2001 | Shiraishi |
| 6,289,564 | B1 | 9/2001 | Novotny |
| 6,294,826 | B1 | 9/2001 | Ida et al. |
| 6,295,185 | B1 | 9/2001 | Stefansky |
| 6,297,936 | B1 | 10/2001 | Kant et al. |
| 6,300,846 | B1 | 10/2001 | Brunker |
| 6,307,255 | B1 | 10/2001 | Stave |
| 6,307,715 | B1 | 10/2001 | Berding et al. |
| 6,308,483 | B1 | 10/2001 | Romine |
| 6,313,412 | B1 | 11/2001 | Trumble et al. |
| 6,316,824 | B1 | 11/2001 | Jiang et al. |
| 6,320,730 | B1 | 11/2001 | Stefansky et al. |
| 6,323,543 | B1 | 11/2001 | Jiang et al. |
| 6,323,544 | B1 | 11/2001 | Cigada et al. |
| 6,330,132 | B1 | 12/2001 | Honda |
| 6,335,107 | B1 | 1/2002 | Abys et al. |
| 6,340,840 | B1 | 1/2002 | Ohsawa et al. |
| 6,349,017 | B1 | 2/2002 | Schott |
| 6,366,431 | B1 | 4/2002 | Tsuchiya et al. |
| 6,376,901 | B1 | 4/2002 | Abbott |
| 6,376,964 | B1 | 4/2002 | Young et al. |
| 6,380,483 | B1 | 4/2002 | Blake |
| 6,381,821 | B1 | 5/2002 | Panyon, Jr. |

(56) References Cited

U.S. PATENT DOCUMENTS

| | | |
|---|---|---|
| 6,387,111 B1 | 5/2002 | Barber |
| 6,395,583 B1 | 5/2002 | Kubara et al. |
| 6,396,667 B1 | 5/2002 | Zhang et al. |
| 6,399,220 B1 | 6/2002 | Abys et al. |
| 6,399,899 B1 | 6/2002 | Ohkawa et al. |
| 6,400,532 B1 | 6/2002 | Mei |
| 6,404,066 B1 | 6/2002 | Tsuji et al. |
| 6,404,594 B1 | 6/2002 | Maruyama et al. |
| 6,407,481 B1 | 6/2002 | Takeuchi et al. |
| 6,424,046 B1 | 7/2002 | Hong et al. |
| 6,424,500 B1 | 7/2002 | Coon et al. |
| 6,445,546 B1 | 9/2002 | Coon |
| 6,452,258 B1 | 9/2002 | Abys et al. |
| 6,459,549 B1 | 10/2002 | Tsuchiya et al. |
| 6,469,386 B1 | 10/2002 | Lee et al. |
| D465,344 S | 11/2002 | Siegert |
| 6,480,359 B1 | 11/2002 | Dunn et al. |
| 6,487,045 B1 | 11/2002 | Yanagisawa |
| 6,490,228 B2 | 12/2002 | Killam |
| 6,493,190 B1 | 12/2002 | Coon |
| 6,493,192 B2 | 12/2002 | Crane et al. |
| 6,498,704 B1 | 12/2002 | Chessman et al. |
| 6,501,625 B1 | 12/2002 | Boismier et al. |
| 6,515,353 B2 | 2/2003 | Stave |
| 6,518,508 B2 | 2/2003 | Park et al. |
| 6,518,653 B1 | 2/2003 | Takagi |
| 6,521,358 B1 | 2/2003 | Tanaka et al. |
| 6,528,868 B1 | 3/2003 | Weiblen et al. |
| 6,539,609 B2 | 4/2003 | Palmer et al. |
| 6,549,376 B1 | 4/2003 | Scura et al. |
| 6,549,736 B2 | 4/2003 | Miyabe et al. |
| 6,563,676 B1 | 5/2003 | Chew et al. |
| 6,570,245 B1 | 5/2003 | Ma |
| 6,581,262 B1 | 6/2003 | Myers |
| 6,593,643 B1 | 7/2003 | Seki et al. |
| 6,596,184 B1 | 7/2003 | Shum et al. |
| 6,597,541 B2 | 7/2003 | Nishida et al. |
| 6,600,631 B1 | 7/2003 | Berding et al. |
| 6,621,653 B1 | 9/2003 | Schirle |
| 6,621,658 B1 | 9/2003 | Nashif |
| 6,636,388 B2 | 10/2003 | Stefansaky |
| 6,639,761 B1 | 10/2003 | Boutaghou et al. |
| 6,646,330 B2 | 11/2003 | Kubara et al. |
| 6,647,621 B1 | 11/2003 | Roen et al. |
| 6,653,763 B2 | 11/2003 | Wang et al. |
| 6,661,617 B1 | 12/2003 | Hipwell, Jr. et al. |
| 6,661,618 B2 | 12/2003 | Fujiwara et al. |
| 6,692,992 B1 | 2/2004 | Cozar et al. |
| 6,695,859 B1 | 2/2004 | Golden et al. |
| 6,704,157 B2 | 3/2004 | Himes et al. |
| 6,704,158 B2 | 3/2004 | Hawwa et al. |
| 6,704,165 B2 | 3/2004 | Kube et al. |
| 6,707,680 B2 | 3/2004 | Schaper |
| 6,710,373 B2 | 3/2004 | Wang |
| 6,711,930 B2 | 3/2004 | Thom et al. |
| 6,713,852 B2 | 3/2004 | Abbott et al. |
| 6,714,384 B2 | 3/2004 | Himes et al. |
| 6,714,385 B1 | 3/2004 | Even et al. |
| 6,724,073 B2 | 4/2004 | Jiang et al. |
| 6,724,580 B2 | 4/2004 | Irie et al. |
| 6,728,057 B2 | 4/2004 | Putnam |
| 6,728,077 B1 | 4/2004 | Murphy |
| 6,731,472 B2 | 5/2004 | Okamoto et al. |
| 6,735,052 B2 | 5/2004 | Dunn et al. |
| 6,735,055 B1 | 5/2004 | Crane et al. |
| 6,737,931 B2 | 5/2004 | Amparan et al. |
| 6,738,225 B1 | 5/2004 | Summers et al. |
| 6,741,424 B1 | 5/2004 | Danielson et al. |
| 6,750,479 B2 | 6/2004 | Haag |
| 6,751,062 B2 | 6/2004 | Kasajima et al. |
| 6,752,661 B2 | 6/2004 | Gu et al. |
| 6,760,182 B2 | 7/2004 | Bement et al. |
| 6,760,194 B2 | 7/2004 | Shiraishi et al. |
| 6,760,196 B1 | 7/2004 | Niu et al. |
| 6,762,913 B1 | 7/2004 | Even et al. |
| 6,765,761 B2 | 7/2004 | Arya |
| 6,771,466 B2 | 8/2004 | Kasajima et al. |
| 6,771,467 B2 | 8/2004 | Kasajima et al. |
| 6,789,593 B1 | 9/2004 | Aono et al. |
| 6,791,802 B2 | 9/2004 | Watanabe et al. |
| 6,796,018 B1 | 9/2004 | Thornton |
| 6,797,888 B2 | 9/2004 | Ookawa et al. |
| 6,798,597 B1 | 9/2004 | Aram et al. |
| 6,801,402 B1 | 10/2004 | Subrahmanyam et al. |
| 6,802,496 B1 | 10/2004 | Preta |
| 6,831,539 B1 | 12/2004 | Hipwell, Jr. et al. |
| 6,833,978 B2 | 12/2004 | Shum et al. |
| 6,839,204 B2 | 1/2005 | Shiraishi et al. |
| 6,841,737 B2 | 1/2005 | Komatsubara et al. |
| 6,856,075 B1 | 2/2005 | Houk et al. |
| 6,859,345 B2 | 2/2005 | Boutaghou et al. |
| 6,870,091 B2 | 3/2005 | Seidler |
| 6,882,506 B2 | 4/2005 | Yamaoka et al. |
| 6,891,700 B2 | 5/2005 | Shiraishi et al. |
| 6,898,042 B2 | 5/2005 | Subrahmanyan |
| 6,900,967 B1 | 5/2005 | Coon et al. |
| 6,922,305 B2 | 7/2005 | Price |
| 6,934,127 B2 | 8/2005 | Yao et al. |
| 6,942,817 B2 | 9/2005 | Yagi et al. |
| 6,943,991 B2 | 9/2005 | Yao et al. |
| 6,950,288 B2 | 9/2005 | Yao et al. |
| 6,961,221 B1 | 11/2005 | Niu et al. |
| 6,963,471 B2 | 11/2005 | Arai et al. |
| 6,975,488 B1 | 12/2005 | Kulangara et al. |
| 6,977,790 B1 | 12/2005 | Chen et al. |
| 7,006,333 B1 | 2/2006 | Summers |
| 7,016,159 B1 | 3/2006 | Bjorstrom et al. |
| 7,020,949 B2 | 4/2006 | Muramatsu et al. |
| 7,023,667 B2 | 4/2006 | Shum |
| 7,050,267 B2 | 5/2006 | Koh et al. |
| 7,057,857 B1 | 6/2006 | Niu et al. |
| 7,064,928 B2 | 6/2006 | Fu et al. |
| 7,068,473 B2 | 6/2006 | O'Neill |
| 7,079,357 B1 | 7/2006 | Kulangara et al. |
| 7,082,670 B2 | 8/2006 | Boismier et al. |
| 7,092,215 B2 | 8/2006 | Someya et al. |
| 7,099,115 B2 | 8/2006 | Yao et al. |
| 7,099,117 B1 | 8/2006 | Subrahmanyam et al. |
| 7,129,418 B2 | 10/2006 | Aonuma et al. |
| 7,130,159 B2 | 10/2006 | Shimizu et al. |
| 7,132,607 B2 | 11/2006 | Yoshimi et al. |
| 7,142,395 B2 | 11/2006 | Swanson et al. |
| 7,144,687 B2 | 12/2006 | Fujisaki et al. |
| 7,158,348 B2 | 1/2007 | Erpelding et al. |
| 7,159,300 B2 | 1/2007 | Yao et al. |
| 7,161,765 B2 | 1/2007 | Ichikawa et al. |
| 7,161,767 B2 | 1/2007 | Hernandez et al. |
| 7,177,119 B1 | 2/2007 | Bennin et al. |
| 7,185,409 B1 | 3/2007 | Myers |
| 7,202,579 B2 | 4/2007 | Kim et al. |
| 7,218,481 B1 | 5/2007 | Bennin et al. |
| 7,241,302 B2 | 7/2007 | Sniffen et al. |
| 7,256,968 B1 | 8/2007 | Krinke |
| 7,271,958 B2 | 9/2007 | Yoon et al. |
| 7,283,331 B2 | 10/2007 | Oh et al. |
| 7,288,590 B2 | 10/2007 | Lechat et al. |
| 7,292,413 B1 | 11/2007 | Coon |
| 7,307,817 B1 | 12/2007 | Mei |
| 7,322,241 B2 | 1/2008 | Kai |
| 7,322,999 B2 | 1/2008 | Kanner et al. |
| 7,336,436 B2 | 2/2008 | Sharma et al. |
| 7,336,444 B2 | 2/2008 | Kido et al. |
| 7,338,693 B2 | 3/2008 | Shikano et al. |
| 7,342,750 B2 | 3/2008 | Yang et al. |
| 7,345,851 B2 | 3/2008 | Hirano et al. |
| 7,375,930 B2 | 5/2008 | Yang et al. |
| 7,379,274 B2 | 5/2008 | Yao et al. |
| 7,382,582 B1 | 6/2008 | Cuevas |
| 7,384,531 B1 | 6/2008 | Peltoma et al. |
| 7,385,788 B2 | 6/2008 | Kubota et al. |
| 7,388,733 B2 | 6/2008 | Swanson et al. |
| 7,391,594 B2 | 6/2008 | Fu et al. |
| 7,403,357 B1 | 7/2008 | Williams |
| 7,408,745 B2 | 8/2008 | Yao et al. |

(56) References Cited

U.S. PATENT DOCUMENTS

| | | |
|---|---|---|
| 7,417,830 B1 | 8/2008 | Kulangara |
| 7,420,778 B2 | 9/2008 | Sassine et al. |
| 7,438,718 B2 | 10/2008 | Milliman et al. |
| 7,459,835 B1 | 12/2008 | Mei et al. |
| 7,460,337 B1 | 12/2008 | Mei |
| 7,466,520 B2 | 12/2008 | White et al. |
| 7,499,246 B2 | 3/2009 | Nakagawa |
| 7,509,859 B2 | 3/2009 | Kai |
| 7,518,830 B1 | 4/2009 | Panchal et al. |
| D592,413 S | 5/2009 | Higashida |
| 7,567,410 B1 | 7/2009 | Zhang et al. |
| 7,595,965 B1 | 9/2009 | Kulangara et al. |
| RE40,975 E | 11/2009 | Evans et al. |
| D605,879 S | 12/2009 | Krauss et al. |
| 7,625,654 B2 | 12/2009 | Vyas et al. |
| 7,629,539 B2 | 12/2009 | Ishii et al. |
| 7,636,222 B1 | 12/2009 | Dobosz et al. |
| 7,643,252 B2 | 1/2010 | Arai et al. |
| 7,649,254 B2 | 1/2010 | Graydon et al. |
| 7,663,841 B2 | 2/2010 | Budde et al. |
| 7,667,921 B2 | 2/2010 | Satoh et al. |
| 7,675,713 B2 | 3/2010 | Ogawa et al. |
| 7,688,552 B2 | 3/2010 | Yao et al. |
| 7,692,899 B2 | 4/2010 | Arai et al. |
| 7,697,237 B1 | 4/2010 | Danielson |
| 7,701,673 B2 | 4/2010 | Wang et al. |
| 7,701,674 B2 | 4/2010 | Arai |
| 7,710,687 B1 | 5/2010 | Carlson et al. |
| 7,710,688 B1 | 5/2010 | Hentges et al. |
| 7,719,798 B2 | 5/2010 | Yao |
| 7,724,476 B1 | 5/2010 | Bjorstrom et al. |
| 7,724,478 B2 | 5/2010 | Deguchi et al. |
| 7,751,153 B1 | 7/2010 | Kulangara et al. |
| 7,768,746 B2 | 8/2010 | Yao et al. |
| 7,782,572 B2 | 8/2010 | Pro |
| 7,804,663 B2 | 9/2010 | Hirano et al. |
| 7,813,083 B2 | 10/2010 | Guo et al. |
| 7,813,084 B1 | 10/2010 | Hentges |
| 7,821,742 B1 | 10/2010 | Mei |
| D626,349 S | 11/2010 | Bashir et al. |
| 7,826,177 B1 | 11/2010 | Zhang et al. |
| 7,832,082 B1 | 11/2010 | Hentges et al. |
| 7,835,113 B1 | 11/2010 | Douglas |
| 7,872,344 B2 | 1/2011 | Fjelstad et al. |
| 7,875,804 B1 | 1/2011 | Tronnes et al. |
| 7,902,639 B2 | 3/2011 | Garrou et al. |
| 7,914,926 B2 | 3/2011 | Kimura et al. |
| 7,923,644 B2 | 4/2011 | Ishii et al. |
| 7,924,530 B1 | 4/2011 | Chocholaty |
| 7,929,252 B1 | 4/2011 | Hentges et al. |
| 7,938,840 B2 | 5/2011 | Golden et al. |
| 7,946,010 B1 | 5/2011 | Myers et al. |
| 7,983,008 B2 | 7/2011 | Liao et al. |
| 7,986,494 B2 | 7/2011 | Pro |
| 8,004,798 B1 | 8/2011 | Dunn |
| 8,072,708 B2 | 12/2011 | Horiuchi |
| 8,085,506 B1 | 12/2011 | Ee et al. |
| 8,085,508 B2 | 12/2011 | Hatch |
| 8,089,728 B2 | 1/2012 | Yao et al. |
| 8,120,878 B1 | 2/2012 | Drape et al. |
| 8,125,736 B2 | 2/2012 | Nojima et al. |
| 8,125,741 B2 | 2/2012 | Shelor |
| 8,144,430 B2 | 3/2012 | Hentges et al. |
| 8,144,436 B2 | 3/2012 | Iriuchijima et al. |
| 8,149,542 B2 | 4/2012 | Ando et al. |
| 8,149,545 B1 | 4/2012 | Chai et al. |
| 8,151,440 B2 | 4/2012 | Tsutsumi et al. |
| 8,154,827 B2 | 4/2012 | Contreras et al. |
| 8,157,947 B2 | 4/2012 | Kim |
| 8,161,626 B2 | 4/2012 | Ikeji |
| 8,169,746 B1 | 5/2012 | Rice et al. |
| 8,174,797 B2 | 5/2012 | Iriuchijima |
| 8,189,281 B2 | 5/2012 | Alex et al. |
| 8,189,301 B2 | 5/2012 | Schreiber |
| 8,194,359 B2 | 6/2012 | Yao et al. |
| 8,199,441 B2 | 6/2012 | Nojima |
| 8,199,442 B2 | 6/2012 | Okawara et al. |
| 8,228,642 B1 | 7/2012 | Hahn et al. |
| 8,233,240 B2 | 7/2012 | Contreras et al. |
| 8,248,731 B2 | 8/2012 | Fuchino |
| 8,248,734 B2 | 8/2012 | Fuchino |
| 8,248,735 B2 | 8/2012 | Fujimoto et al. |
| 8,248,736 B2 | 8/2012 | Hanya et al. |
| 8,254,062 B2 | 8/2012 | Greminger |
| 8,259,416 B1 | 9/2012 | Davis et al. |
| 8,264,797 B2 | 9/2012 | Emley |
| 8,284,524 B2 | 10/2012 | Meyer |
| 8,289,652 B2 | 10/2012 | Zambri et al. |
| 8,289,656 B1 | 10/2012 | Huber |
| 8,295,012 B1 | 10/2012 | Tian et al. |
| 8,296,929 B2 | 10/2012 | Hentges et al. |
| 8,300,362 B2 | 10/2012 | Virmani et al. |
| 8,300,363 B2 | 10/2012 | Arai et al. |
| 8,305,712 B2 | 11/2012 | Contreras et al. |
| 8,310,790 B1 | 11/2012 | Fanslau, Jr. |
| 8,331,060 B2 | 12/2012 | Kashima |
| 8,331,061 B2 | 12/2012 | Hanya et al. |
| 8,339,748 B2 | 12/2012 | Shum et al. |
| 8,351,160 B2 | 1/2013 | Fujimoto |
| 8,363,361 B2 | 1/2013 | Hanya et al. |
| 8,369,046 B2 | 2/2013 | Nojima |
| 8,379,349 B1 | 2/2013 | Pro et al. |
| 8,395,865 B2 | 3/2013 | Anandan |
| 8,405,933 B2 | 3/2013 | Soga |
| 8,405,934 B2 | 3/2013 | Fuchino |
| 8,446,694 B1 | 5/2013 | Tian et al. |
| 8,456,780 B1 | 6/2013 | Ruiz |
| 8,467,153 B1 | 6/2013 | Pan et al. |
| 8,498,082 B1 | 7/2013 | Padeski et al. |
| 8,503,133 B2 | 8/2013 | Arai et al. |
| 8,508,888 B2 | 8/2013 | Ohsawa |
| 8,526,142 B1 | 9/2013 | Dejkoonmak et al. |
| 8,542,465 B2 | 9/2013 | Liu et al. |
| 8,553,364 B1 | 10/2013 | Schreiber et al. |
| 8,559,137 B2 | 10/2013 | Imuta |
| 8,582,243 B2 | 11/2013 | Feng et al. |
| 8,593,764 B1 | 11/2013 | Tian et al. |
| 8,593,765 B2 | 11/2013 | Uematsu et al. |
| D695,535 S | 12/2013 | Moburg et al. |
| 8,630,067 B2 | 1/2014 | Ando et al. |
| 8,634,166 B2 | 1/2014 | Ohnuki et al. |
| 8,665,565 B2 | 3/2014 | Pro et al. |
| 8,665,567 B2 | 3/2014 | Shum et al. |
| 8,675,314 B1 | 3/2014 | Bjorstrom et al. |
| 8,681,456 B1 | 3/2014 | Miller et al. |
| 8,717,712 B1 | 5/2014 | Bennin et al. |
| 8,730,621 B2 | 5/2014 | Brandts et al. |
| D707,048 S | 6/2014 | Nishida et al. |
| 8,741,195 B2 | 6/2014 | Kurihara et al. |
| 8,780,503 B2 | 7/2014 | Wright et al. |
| 8,792,214 B1 | 7/2014 | Bjorstrom et al. |
| D711,125 S | 8/2014 | Nishida et al. |
| 8,834,660 B1 | 9/2014 | Scheele et al. |
| 8,885,297 B1 | 11/2014 | Bjorstrom et al. |
| 8,885,299 B1 | 11/2014 | Bennin et al. |
| 8,891,206 B2 | 11/2014 | Miller |
| 8,896,968 B2 | 11/2014 | Miller et al. |
| 8,896,969 B1 | 11/2014 | Miller et al. |
| 8,896,970 B1 | 11/2014 | Miller et al. |
| 8,921,707 B2 | 12/2014 | Ohnuki |
| D723,821 S | 3/2015 | Kondou |
| 9,007,726 B2 | 4/2015 | Bennin et al. |
| 9,036,302 B2 | 5/2015 | Bjorstrom et al. |
| 9,070,392 B1 | 6/2015 | Bjorstrom |
| 9,093,117 B2 | 7/2015 | Tobias |
| 9,117,468 B1 | 8/2015 | Zhang et al. |
| 9,147,413 B2 | 9/2015 | Miller et al. |
| 9,196,277 B2 | 11/2015 | Omachi |
| 9,224,410 B1 | 12/2015 | Ee et al. |
| 9,240,203 B2 | 1/2016 | Miller et al. |
| 9,245,555 B2 | 1/2016 | Bennin et al. |
| 9,257,139 B2 | 2/2016 | Miller |
| 9,296,188 B1 | 3/2016 | Cray et al. |
| 9,311,938 B1 | 4/2016 | Ee et al. |

(56) References Cited

U.S. PATENT DOCUMENTS

| | | |
|---|---|---|
| 9,318,136 B1 | 4/2016 | Bjorstrom et al. |
| 9,330,695 B1 | 5/2016 | Chen et al. |
| 9,330,697 B2 | 5/2016 | Miller et al. |
| 9,443,547 B2 | 9/2016 | Scheele et al. |
| 9,734,852 B2 * | 8/2017 | Christenson et al. . G11B 5/486 |
| 9,984,708 B2 | 5/2018 | Christenson et al. |
| 2001/0001937 A1 | 5/2001 | Benes et al. |
| 2001/0012181 A1 | 8/2001 | Inoue et al. |
| 2001/0013993 A1 | 8/2001 | Coon |
| 2001/0015481 A1 | 8/2001 | Miyaki et al. |
| 2001/0030838 A1 | 10/2001 | Takadera et al. |
| 2001/0043443 A1 | 11/2001 | Okamoto et al. |
| 2002/0012194 A1 | 1/2002 | Inagaki et al. |
| 2002/0047186 A1 | 4/2002 | Tellkamp |
| 2002/0070434 A1 | 6/2002 | Abbott et al. |
| 2002/0075606 A1 | 6/2002 | Nishida et al. |
| 2002/0117740 A1 | 8/2002 | Jang et al. |
| 2002/0118492 A1 | 8/2002 | Watanabe et al. |
| 2002/0149888 A1 | 10/2002 | Motonishi et al. |
| 2002/0153596 A1 | 10/2002 | Tsubosaki et al. |
| 2002/0159845 A1 | 10/2002 | Mikell |
| 2002/0168897 A1 | 11/2002 | Chang |
| 2002/0176209 A1 | 11/2002 | Schulz et al. |
| 2002/0178778 A1 | 12/2002 | Thom et al. |
| 2002/0180012 A1 | 12/2002 | Baker et al. |
| 2002/0185716 A1 | 12/2002 | Abys et al. |
| 2003/0011048 A1 | 1/2003 | Abbott et al. |
| 2003/0011118 A1 | 1/2003 | Kasajima et al. |
| 2003/0011936 A1 | 1/2003 | Himes et al. |
| 2003/0025182 A1 | 2/2003 | Abys et al. |
| 2003/0051890 A1 | 3/2003 | Marshall |
| 2003/0053258 A1 | 3/2003 | Dunn et al. |
| 2003/0089520 A1 | 5/2003 | Ooyabu et al. |
| 2003/0128474 A1 | 7/2003 | Schulz et al. |
| 2003/0135985 A1 | 7/2003 | Yao et al. |
| 2003/0174445 A1 | 9/2003 | Luo |
| 2003/0202293 A1 | 10/2003 | Nakamura et al. |
| 2003/0210499 A1 | 11/2003 | Arya |
| 2003/0218236 A1 | 11/2003 | Wright et al. |
| 2004/0007322 A1 | 1/2004 | Lechat et al. |
| 2004/0008449 A1 | 1/2004 | Girard |
| 2004/0027727 A1 | 2/2004 | Shimizu et al. |
| 2004/0027728 A1 | 2/2004 | Coffey et al. |
| 2004/0032093 A1 | 2/2004 | Razavi |
| 2004/0070884 A1 | 4/2004 | Someya et al. |
| 2004/0084198 A1 | 5/2004 | Seidler |
| 2004/0092971 A1 | 5/2004 | Sniffin et al. |
| 2004/0092998 A1 | 5/2004 | Sniffin et al. |
| 2004/0102797 A1 | 5/2004 | Golden et al. |
| 2004/0125508 A1 | 7/2004 | Yang et al. |
| 2004/0181932 A1 | 9/2004 | Yao et al. |
| 2004/0199182 A1 | 10/2004 | Milliman et al. |
| 2004/0207957 A1 | 10/2004 | Kasajima et al. |
| 2004/0221447 A1 | 11/2004 | Ishii et al. |
| 2004/0225313 A1 | 11/2004 | Kanner et al. |
| 2004/0250952 A1 | 12/2004 | Lechat et al. |
| 2004/0264056 A1 | 12/2004 | Jang et al. |
| 2005/0010241 A1 | 1/2005 | Milliman et al. |
| 2005/0045914 A1 | 3/2005 | Agranat et al. |
| 2005/0060864 A1 | 3/2005 | Nikolaidis et al. |
| 2005/0061542 A1 | 3/2005 | Aonuma et al. |
| 2005/0063097 A1 | 3/2005 | Maruyama et al. |
| 2005/0101983 A1 | 5/2005 | Loshakove et al. |
| 2005/0105217 A1 | 5/2005 | Kwon et al. |
| 2005/0117257 A1 | 6/2005 | Thaveeprungsriporn et al. |
| 2005/0180053 A1 | 8/2005 | Dovek et al. |
| 2005/0254175 A1 | 11/2005 | Swanson et al. |
| 2005/0280944 A1 | 12/2005 | Yang et al. |
| 2006/0044698 A1 | 3/2006 | Hirano et al. |
| 2006/0077594 A1 | 4/2006 | White et al. |
| 2006/0181812 A1 | 8/2006 | Kwon et al. |
| 2006/0193086 A1 | 8/2006 | Zhu et al. |
| 2006/0209465 A1 | 9/2006 | Takikawa et al. |
| 2006/0238924 A1 | 10/2006 | Gatzen |
| 2006/0248702 A1 | 11/2006 | Nikolaidis et al. |
| 2006/0274452 A1 | 12/2006 | Arya |
| 2006/0274453 A1 | 12/2006 | Arya |
| 2006/0279880 A1 | 12/2006 | Boutaghou et al. |
| 2007/0005072 A1 | 1/2007 | Castillo et al. |
| 2007/0041123 A1 | 2/2007 | Swanson et al. |
| 2007/0057548 A1 | 3/2007 | Buffa |
| 2007/0133128 A1 | 6/2007 | Arai |
| 2007/0153430 A1 | 7/2007 | Park et al. |
| 2007/0223146 A1 | 9/2007 | Yao et al. |
| 2007/0227769 A1 | 10/2007 | Brodsky et al. |
| 2007/0253176 A1 | 11/2007 | Ishii et al. |
| 2007/0293884 A9 | 12/2007 | Cole et al. |
| 2008/0024928 A1 | 1/2008 | Yang |
| 2008/0024933 A1 | 1/2008 | Yao et al. |
| 2008/0071302 A1 | 3/2008 | Castillo et al. |
| 2008/0084638 A1 | 4/2008 | Bonin |
| 2008/0124842 A1 | 5/2008 | Wang et al. |
| 2008/0144225 A1 | 6/2008 | Yao et al. |
| 2008/0192384 A1 | 8/2008 | Danielson et al. |
| 2008/0198511 A1 | 8/2008 | Hirano et al. |
| 2008/0229842 A1 | 9/2008 | Ohtsuka et al. |
| 2008/0247131 A1 | 10/2008 | Hitomi et al. |
| 2008/0251201 A1 | 10/2008 | Sikkel et al. |
| 2008/0264557 A1 | 10/2008 | Kim |
| 2008/0272122 A1 | 11/2008 | Son |
| 2008/0273266 A1 | 11/2008 | Pro |
| 2008/0273269 A1 | 11/2008 | Pro |
| 2009/0027807 A1 | 1/2009 | Yao et al. |
| 2009/0036904 A1 | 2/2009 | Milliman et al. |
| 2009/0080117 A1 | 3/2009 | Shimizu et al. |
| 2009/0135523 A1 | 5/2009 | Nishiyama et al. |
| 2009/0147407 A1 | 6/2009 | Huang et al. |
| 2009/0168249 A1 | 7/2009 | McCaslin et al. |
| 2009/0176120 A1 | 7/2009 | Wang |
| 2009/0183359 A1 | 7/2009 | Tsutsumi et al. |
| 2009/0190263 A1 | 7/2009 | Miura et al. |
| 2009/0244786 A1 | 10/2009 | Hatch |
| 2009/0284870 A1 | 11/2009 | Nojima et al. |
| 2009/0294740 A1 | 12/2009 | Kurtz et al. |
| 2010/0007993 A1 | 1/2010 | Contreras et al. |
| 2010/0067151 A1 | 3/2010 | Okawara et al. |
| 2010/0073825 A1 | 3/2010 | Okawara |
| 2010/0097726 A1 | 4/2010 | Greminger et al. |
| 2010/0142081 A1 | 6/2010 | Funabashi et al. |
| 2010/0143743 A1 | 6/2010 | Yamasaki et al. |
| 2010/0165515 A1 | 7/2010 | Ando |
| 2010/0165516 A1 | 7/2010 | Fuchino |
| 2010/0177445 A1 | 7/2010 | Fuchino |
| 2010/0195251 A1 | 8/2010 | Nojima et al. |
| 2010/0195252 A1 | 8/2010 | Kashima |
| 2010/0208390 A1 | 8/2010 | Hanya et al. |
| 2010/0208425 A1 | 8/2010 | Rapisarda |
| 2010/0220414 A1 | 9/2010 | Klarqvist et al. |
| 2010/0230144 A1 | 9/2010 | Schreiber et al. |
| 2010/0246071 A1 | 9/2010 | Nojima et al. |
| 2010/0271735 A1 | 10/2010 | Schreiber |
| 2010/0277834 A1 | 11/2010 | Nojima |
| 2010/0290158 A1 | 11/2010 | Hanya et al. |
| 2011/0013319 A1 | 1/2011 | Soga et al. |
| 2011/0058281 A1 | 3/2011 | Arai et al. |
| 2011/0058282 A1 | 3/2011 | Fujimoto et al. |
| 2011/0075301 A1 | 3/2011 | Tsuchiya et al. |
| 2011/0096438 A1 | 4/2011 | Takada et al. |
| 2011/0096440 A1 | 4/2011 | Greminger |
| 2011/0123145 A1 | 5/2011 | Nishio |
| 2011/0141624 A1 | 6/2011 | Fuchino et al. |
| 2011/0141626 A1 | 6/2011 | Contreras et al. |
| 2011/0159767 A1 | 6/2011 | Sakurai et al. |
| 2011/0228425 A1 | 9/2011 | Liu et al. |
| 2011/0242708 A1 | 10/2011 | Fuchino |
| 2011/0279929 A1 | 11/2011 | Kin |
| 2011/0299197 A1 | 12/2011 | Eguchi |
| 2011/0299288 A1 | 12/2011 | Rapisarda |
| 2012/0000376 A1 | 1/2012 | Kurihara et al. |
| 2012/0002329 A1 | 1/2012 | Shum et al. |
| 2012/0081813 A1 | 4/2012 | Ezawa et al. |
| 2012/0081815 A1 | 4/2012 | Arai et al. |
| 2012/0087041 A1 | 4/2012 | Ohsawa |
| 2012/0099226 A1 | 4/2012 | Zambri et al. |

(56) References Cited

U.S. PATENT DOCUMENTS

| | | |
|---|---|---|
| 2012/0113547 A1 | 5/2012 | Sugimoto |
| 2012/0176703 A1 | 7/2012 | Nojima |
| 2012/0180956 A1 | 7/2012 | Kim |
| 2012/0248759 A1 | 10/2012 | Feith |
| 2012/0276232 A1 | 11/2012 | Marczyk et al. |
| 2012/0279757 A1 | 11/2012 | Ishii et al. |
| 2012/0281316 A1 | 11/2012 | Fujimoto et al. |
| 2012/0285306 A1 | 11/2012 | Weibelt |
| 2013/0006281 A1 | 1/2013 | Golden et al. |
| 2013/0020112 A1 | 1/2013 | Ohsawa |
| 2013/0021698 A1 | 1/2013 | Greminger et al. |
| 2013/0047807 A1 | 2/2013 | Sotokawa et al. |
| 2013/0055561 A1 | 3/2013 | Tsutsumi et al. |
| 2013/0107488 A1 | 5/2013 | Arai |
| 2013/0176646 A1 | 7/2013 | Arai |
| 2013/0242434 A1 | 9/2013 | Bjorstrom et al. |
| 2013/0242436 A1 | 9/2013 | Yonekura et al. |
| 2013/0248231 A1 | 9/2013 | Tobias |
| 2013/0265674 A1 | 10/2013 | Fanslau |
| 2013/0279042 A1 | 10/2013 | Xiong et al. |
| 2014/0022670 A1 | 1/2014 | Takikawa et al. |
| 2014/0022671 A1 | 1/2014 | Takikawa et al. |
| 2014/0022674 A1 | 1/2014 | Takikawa et al. |
| 2014/0022675 A1 | 1/2014 | Hanya et al. |
| 2014/0063660 A1 | 3/2014 | Bjorstrom et al. |
| 2014/0078621 A1 | 3/2014 | Miller et al. |
| 2014/0085754 A1 | 3/2014 | Hanya et al. |
| 2014/0085755 A1 | 3/2014 | Hanya et al. |
| 2014/0098440 A1 | 4/2014 | Miller et al. |
| 2014/0146649 A1 | 5/2014 | Bennin et al. |
| 2014/0168821 A1 | 6/2014 | Miller |
| 2014/0198412 A1 | 7/2014 | Miller et al. |
| 2014/0216221 A1 | 8/2014 | Mashima |
| 2014/0362475 A1 | 12/2014 | Bjorstrom et al. |
| 2014/0362476 A1 | 12/2014 | Miller et al. |
| 2015/0016235 A1 | 1/2015 | Bennin et al. |
| 2015/0055254 A1 | 2/2015 | Bjorstrom et al. |
| 2015/0055255 A1 | 2/2015 | Bennin et al. |
| 2015/0055256 A1 | 2/2015 | Miller |
| 2015/0062758 A1 | 3/2015 | Miller et al. |
| 2015/0162033 A1 | 6/2015 | Miller et al. |
| 2015/0194170 A1 | 7/2015 | Roen |
| 2015/0194176 A1 | 7/2015 | Scheele et al. |
| 2015/0356987 A1 | 12/2015 | Bennin et al. |
| 2016/0171995 A1 | 6/2016 | Bjorstrom |
| 2016/0196843 A1 | 7/2016 | Bjorstrom et al. |
| 2016/0240218 A1 | 8/2016 | Cray et al. |

FOREIGN PATENT DOCUMENTS

| | | |
|---|---|---|
| EP | 0591954 B1 | 4/1994 |
| EP | 0834867 B1 | 5/2007 |
| JP | 9198825 A | 7/1997 |
| JP | 10003632 A | 1/1998 |
| JP | H11-284294 A | 10/1999 |
| JP | 2001057039 A | 2/2001 |
| JP | 2001202731 A | 7/2001 |
| JP | 2001-209918 A | 8/2001 |
| JP | 2001307442 A | 11/2001 |
| JP | 2001-352137 A | 12/2001 |
| JP | 2002050140 A | 2/2002 |
| JP | 2002170607 A | 6/2002 |
| JP | 2003223771 A | 8/2003 |
| JP | 2003234549 A | 8/2003 |
| JP | 2004039056 A | 2/2004 |
| JP | 2004300489 A | 10/2004 |
| JP | 2005209336 A | 8/2005 |
| JP | 2007115864 A | 5/2007 |
| JP | 2008276927 A | 11/2008 |
| JP | 2012-198974 A | 10/2012 |
| JP | 2013-045485 A | 3/2013 |
| JP | 2015-111704 A | 6/2015 |
| JP | 2015130221 A | 7/2015 |
| JP | 2015130225 A | 7/2015 |
| KR | 20020036600 A | 5/2002 |
| KR | 20030006982 A | 1/2003 |
| WO | WO1998020485 A1 | 5/1998 |
| WO | 2014021440 A1 | 2/2014 |
| WO | WO2014190001 A1 | 11/2014 |
| WO | 2015009733 A1 | 1/2015 |
| WO | 2015027034 A2 | 2/2015 |

OTHER PUBLICATIONS

Decision to Grant for Japanese Patent Application No. 2017-565147 dated Mar. 17, 2020.

"Calculating VLSI Wiring Capacitance", Jun. 1990, IBM Technical Disclosure Bulletin, vol. 33, Issue No. 1A, 2 pages.

3M Ultra-Pure Viscoelastic Damping Polymer 242NRO1, Technical Data, Mar. 2012, 4 pages.

Cheng, Yang-Tse, "Vapor deposited thin gold coatings for high temperature electrical contacts", Electrical Contacts, 1996, Joint with the 18th International Conference on Electrical Contacts, Proceedings of the Forty-Second IEEE Holm.Conference, Sep. 16-20, 1996 (abstract only).

Fu, Yao, "Design of a Hybrid Magnetic and Piezoelectric Polymer Microactuator", a thesis submitted to Industrial Research Institute Swinburne (IRIS), Swinburne University of Technology, Hawthorn, Victoria, Australia, Dec. 2005.

Harris, N.R. et al., "A Multilayer Thick-film PZT Actuator for MEMs Applications", Sensors and Actuators A: Physical, vol. 132, No. 1, Nov. 8, 2006, 4 pages.

Hentges, Reed T. et al., "Exploring Low Loss Suspension Interconnects for High Data Rates in Hard Disk Drives", IEEE Transactions on Magnetics, vol. 44, No. 1, Jan. 2008, pp. 169-174.

Jing, Yang, "Fabrication of piezoelectric ceramic micro-actuator and its reliability for hard disk drives", Ultrasonics, Ferroelectrics and Frequency Control, IEEE, vol. 51, No. 11, Nov. 2004, pp. 1470-1476 (abstract only).

Kon, Stanley et al., "Piezoresistive and Piezoelectric MEMS Strain Sensors for Vibration Detection", Sensors and Smart Structures Technologies for Civil, Mechanical, and Aerospace Systems 2007, Proc. of SPIE vol. 6529.

Lengert, David et al., "Design of suspension-based and collocated dual stage actuated suspensions", Microsyst Technol (2012) 18:1615-1622.

Li, Longqiu et al., "An experimental study of the dimple-gimbal interface in a hard disk drive", Microsyst Technol (2011) 17:863-868.

Pichonat, Tristan et al., "Recent developments in MEMS-based miniature fuel cells", Microsyst Technol (2007) 13:1671-1678.

Pozar, David M. Microwave Engineering, 4th Edition, copyright 2012 by John Wiley & Sons, Inc., pp. 422-426.

Raeymaekers, B. et al., "Investigation of fretting wear at the dimple/gimbal interface in a hard disk drive suspension", Wear, vol. 268, Issues 11-12, May 12, 2010, pp. 1347-1353.

Raeymaekers, Bart et al., "Fretting Wear Between a Hollow Sphere and Flat Surface", Proceedings of the STLE/ASME International Joint Tribology Conference, Oct. 19-21, 2009, Memphis, TN USA, 4 pages.

Rajagopal, Indira et al., "Gold Plating of Critical Components for Space Applications: Challenges and Solutions", Gold Bull., 1992, 25(2), pp. 55-66.

Yoon, Wonseok et al., "Evaluation of coated metallic bipolar plates for polymer electrolyte membrane fuel cells", The Journal of Power Sources, vol. 179, No. 1, Dec. 23, 2007, abstract only.

* cited by examiner

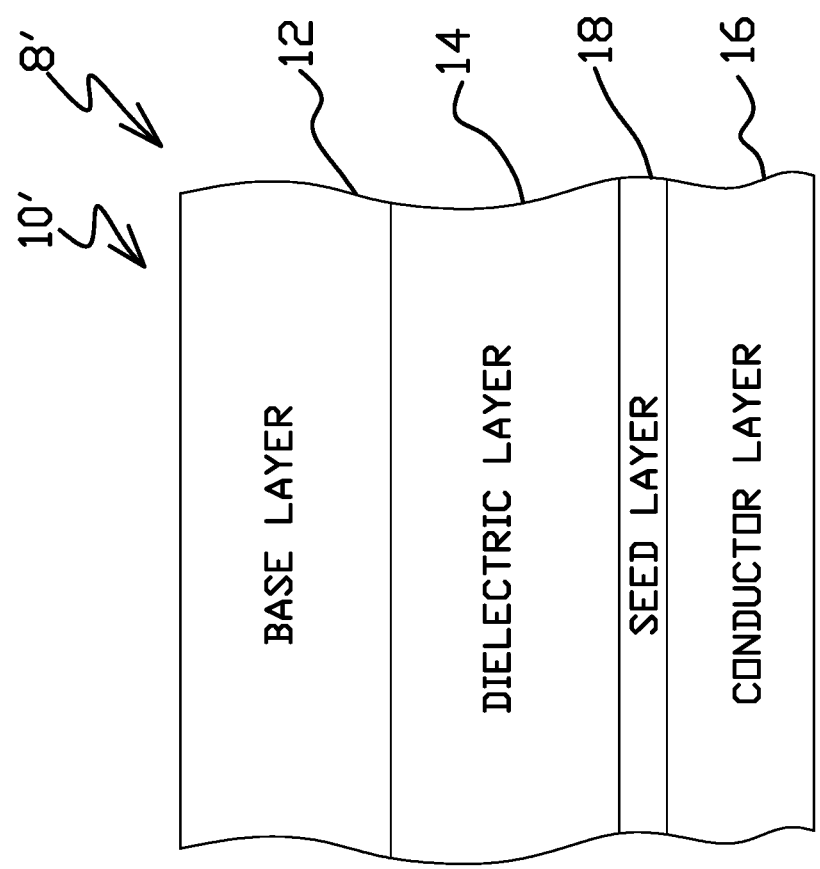

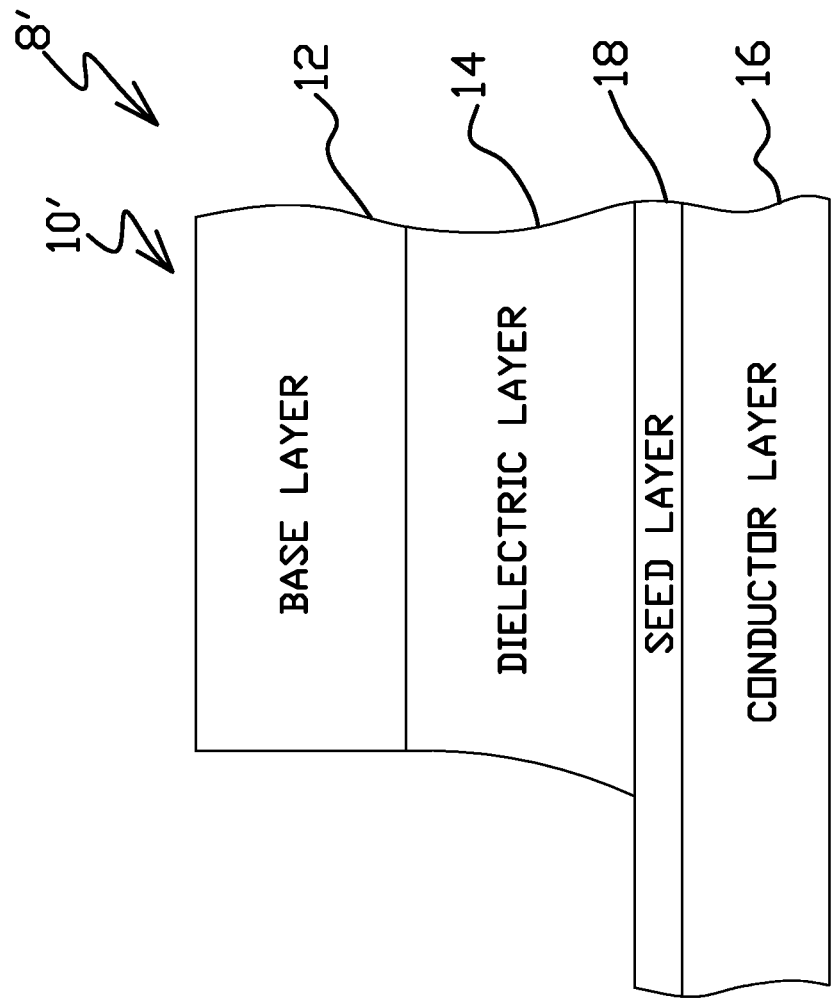

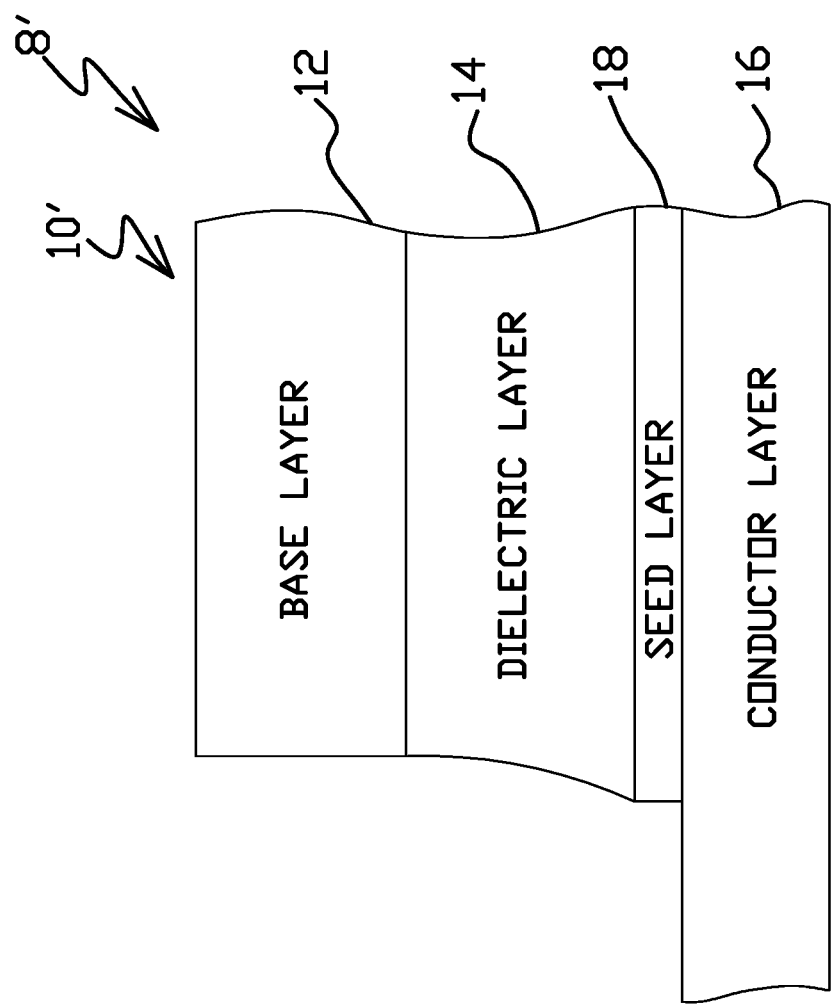

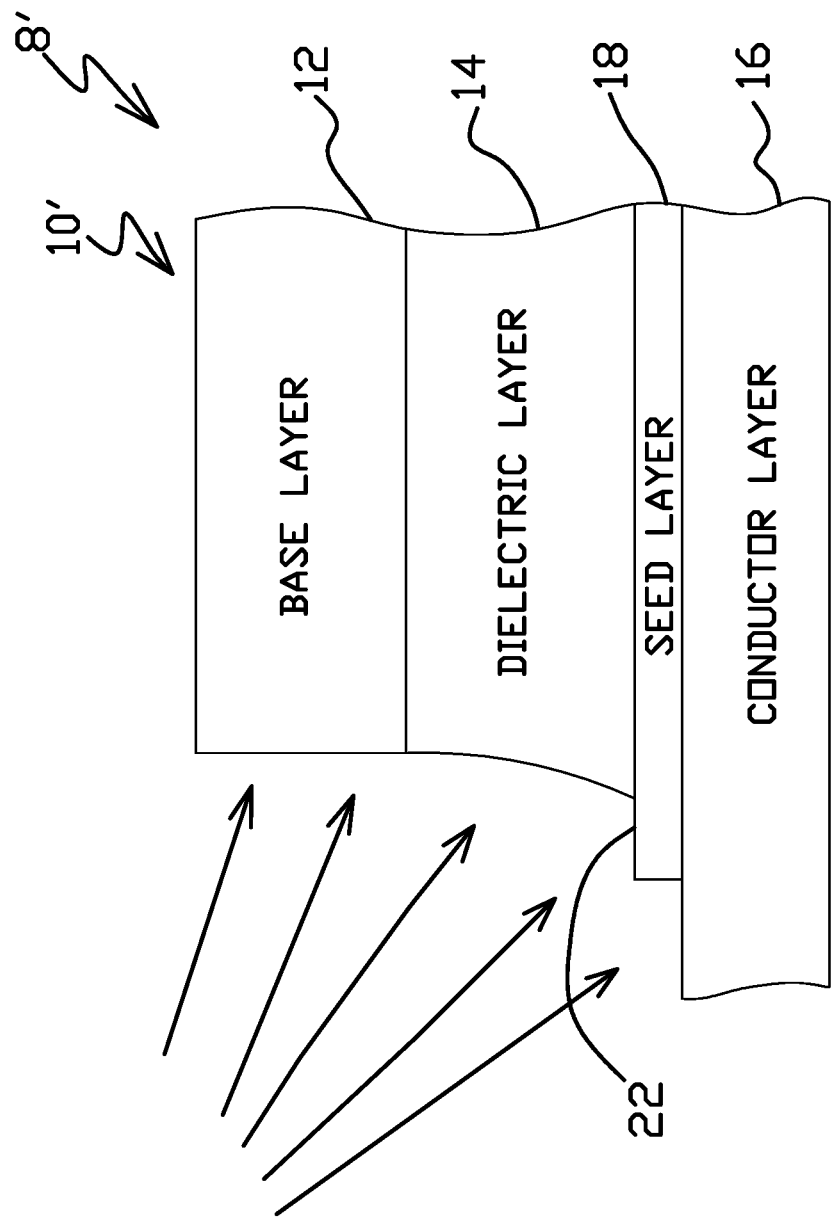

US 10,748,566 B2

DISK DRIVE HEAD SUSPENSION STRUCTURES HAVING IMPROVED GOLD-DIELECTRIC JOINT RELIABILITY

CROSS REFERENCE TO RELATED APPLICATION

This application is a continuation of U.S. patent application Ser. No. 15/980,649, filed May 15, 2018, entitled DISK DRIVE HEAD SUSPENSION STRUCTURES HAVING IMPROVED GOLD-DIELECTRIC JOINT RELIABILITY, which is a continuation of U.S. patent application Ser. No. 15/676,698, filed Aug. 14, 2017, entitled METHOD FOR MANUFACTURING DISK DRIVE HEAD SUSPENSION STRUCTURES HAVING IMPROVED GOLD-DIELECTRIC JOINT RELIABILITY, now U.S. Pat. No. 9,984,708, which is a divisional of U.S. patent application Ser. No. 15/189,424, filed Jun. 22, 2016, entitled DISK DRIVE HEAD SUSPENSION STRUCTURES HAVING IMPROVED GOLD-DIELECTRIC JOINT RELIABILITY, now U.S. Pat. No. 9,734,852, which claims the benefit of U.S. Provisional Application Ser. No. 62/186,721, filed Jun. 30, 2015, and entitled, DISK DRIVE HEAD SUSPENSION STRUCTURES HAVING IMPROVED GOLD-DIELECTRIC JOINT RELIABILITY, each of which is incorporated herein by reference in its entirety for all purposes.

FIELD OF THE INVENTION

The invention relates generally to disk drive head suspensions and flexures. Embodiments of the invention relate to structures having gold (and other corrosion-resistant material)-dielectric interfaces and manufacturing methods.

BACKGROUND

Integrated lead or wireless disk drive head suspensions and flexures commonly include structures having a relatively noncorrosive material such as gold and/or nickel that is plated or otherwise applied to the surface of a relatively more corrosive conductor such as copper or copper alloy. The gold is sometimes plated on the conductor through an opening in a polyimide or other dielectric layer. In structures of these types an edge of the gold plating can form a joint or interface with the dielectric. The Yonekura et al. U.S. Patent Application Publication 2013/0242436, for example, discloses in FIG. 19C a "backside access" flexure terminal having a structure of this type. The terminal face on a wiring layer is exposed by a through hole in a metal layer and an insulating layer, and the terminal face is gold plated.

Unfortunately, the joint between the gold plating and the dielectric layer in structures of these types is susceptible to separation. Any void or crevice that forms between the gold plating and dielectric can provide access to the conductor by moisture or other substances, leaving the conductor vulnerable to undesired corrosion. There is, therefore, a continuing need for improved structures having enhanced gold-to-dielectric joint reliability. Structures of these types that can be efficiently manufactured would be especially desirable.

SUMMARY

Embodiments of the invention include a disk drive head suspension or flexure having a portion, such as a terminal pad or flying trace, comprising a dielectric layer, a conductor layer, a seed layer between the dielectric layer and the conductor layer, and a noncorrosive layer on the seed layer side of the conductor layer. The seed layer has a strip that extends beyond the edge of the dielectric layer. The noncorrosive layer extends over the strip of the seed layer and into contact with the edge of the dielectric layer. Other embodiments include a base layer on the side of the dielectric layer opposite the seed layer.

BRIEF DESCRIPTION OF THE DRAWINGS

FIGS. 2a-2e are detailed illustrations of a structure at a sequence of process steps during the manufacture of the portion of the flexure shown in FIG. 1 in accordance with embodiments of the invention.

DESCRIPTION OF THE INVENTION

Figure 1:
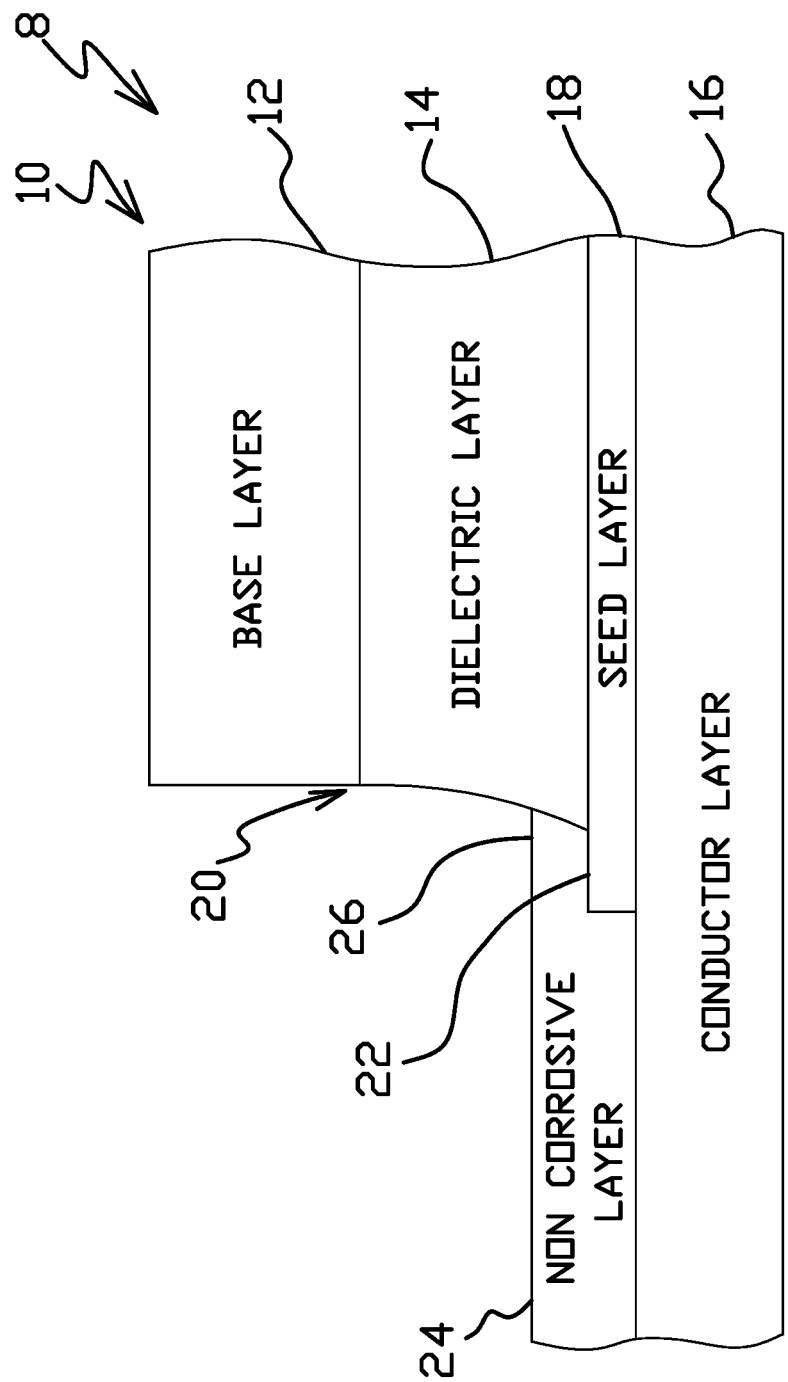
FIG. 1 is a detailed illustration of a portion of a flexure having a noncorrosive material-dielectric joint in accordance with embodiments of the invention.

FIG. 1 is an illustration of a portion 10 of an integrated lead suspension or flexure 8 having a noncorrosive material-dielectric interface or joint in accordance with embodiments of the invention. As shown, the portion 10 includes a base layer 12, which can be a spring metal such as stainless steel, and a polyimide or other dielectric layer 14 on a surface of the base layer. A conductor layer 16 is on a side of the dielectric layer 14 opposite the base layer 12. Conductor layer 16 includes copper or copper alloy in embodiments, a metal that is relatively corrosive when exposed to moisture and other substances. A seed layer 18, which includes chromium in embodiments, is located between the dielectric layer 14 and the conductor layer 16. At least a portion of the dielectric layer 14, and a portion of the base layer 12 in the illustrated embodiment, define an edge 20. A section or strip 22 of the seed layer 18 extends beyond the edge 20 of the dielectric layer 14. A noncorrosive layer 24 is located on the surface of the conductor layer 16 facing the seed layer 18, and includes a portion 26 that overlies the strip 22 of the seed layer and contacts the dielectric layer 14 to form a joint or interface with the dielectric layer at the edge 20. The noncorrosive layer 24 includes gold and/or nickel in embodiments, metals that are relatively noncorrosive with respect to the conductor layer 16 when exposed to moisture and other substances.

The portion 10 can be any of several different structures on the flexure 8. In embodiments, for example, the noncorrosive layer 24 and adjacent portion of the conductor layer 16 can be a backside access terminal pad of an integrated lead (e.g., for connection to a second stage actuator motor (not shown) on the flexure, or on the tail of the flexure for connection to other connectors (not shown) to the disk drive electronics). In these and other embodiments the noncorrosive layer 24 and adjacent portion of the conductor layer 16 can also be base layer-unsupported or flying leads on the flexure 8. These and other embodiments of flexure 8 can include other structures with portions such as 10 having noncorrosive material-dielectric interfaces in accordance with embodiments of the invention.

The section or strip 22 of the seed layer 18 provides a surface to which the noncorrosive layer 24 adheres, thereby enhancing the strength and integrity of the noncorrosive material-dielectric interface. The noncorrosive material-dielectric interface is therefore less susceptible to separation and reduces the possibility of corrosion on the conductor layer 16 at the interface. In embodiments, the strip 22 can be on the order of 300 nm deep (e.g., the distance between the edge of the strip and the dielectric layer 14). The depth of the strip 22 can be greater or lesser distances in other embodiments. The depth and other dimensions of the strip 22 can, for example, be determined based on any of a number of factors, such as the natures and/or dimensions of the dielectric layer 14, conductor layer 16, seed layer 18 and/or noncorrosive layer 24, and/or the nature of the portion 10 (e.g., the extent that the portion 10 is subjected to stresses that might tend to harm the integrity of the interface).

Figure 2B:
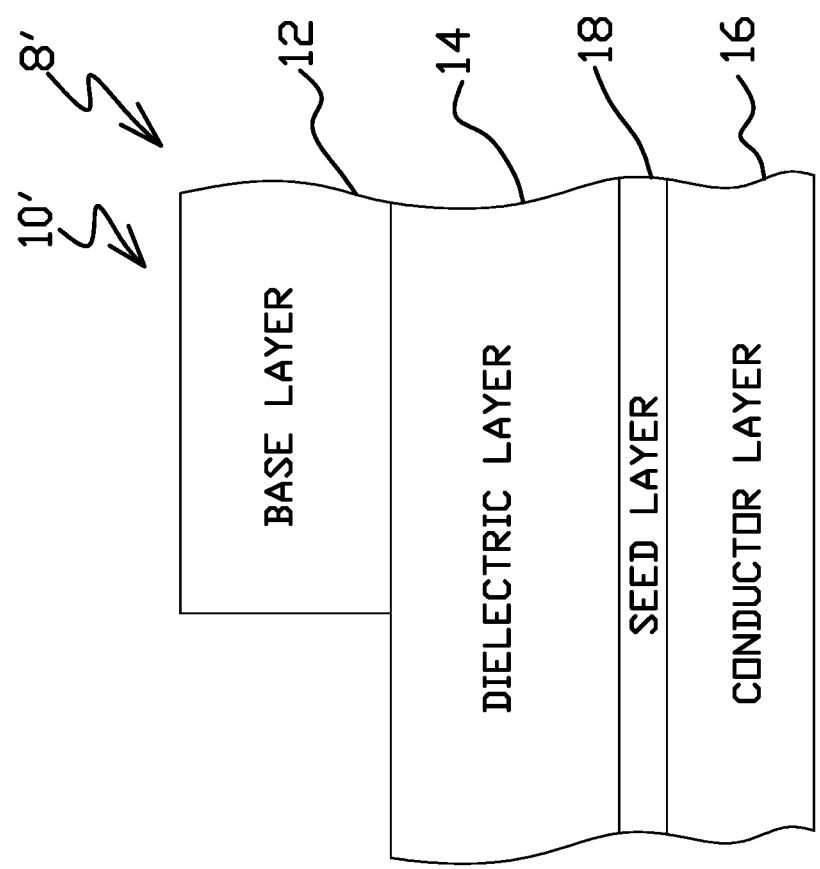

Embodiments of a method including a sequence of steps for forming the flexure 8 having portion 10 can be described with reference to FIGS. 2a-2e. FIG. 2a is an illustration the flexure 8' and portion 10' at an intermediate stage of manufacture, including a structure having the overlying base layer 12, dielectric layer 14, seed layer 18 and conductor layer 16. Conventional additive deposition and/or subtractive processes such as wet (e.g., chemical) and dry (e.g., plasma) etching, electro plating and electroless plating and sputtering processes in connection with photolithography (e.g., use of patterned and/or unpatterned photoresist masks) can be used to manufacture the flexure 8 and intermediate structure of flexure 8'. Additive and subtractive processes of these types are, for example, disclosed generally in the following U.S. patents, all of which are incorporated herein by reference for all purposes: Bennin et al. U.S. Pat. No. 8,885,299 entitled Low Resistance Ground Joints for Dual Stage Actuation Disk Drive Suspensions, Rice et al. U.S. Pat. No. 8,169,746 entitled Integrated Lead Suspension with Multiple Trace Configurations, Hentges et al. U.S. Pat. No. 8,144,430 entitled Multi-Layer Ground Plane Structures for Integrated Lead Suspensions, Hentges et al. U.S. Pat. No. 7,929,252 entitled Multi-Layer Ground Plane Structures for Integrated Lead Suspensions, Swanson et al. U.S. Pat. No. 7,388,733 entitled Method for Making Noble Metal Conductive Leads for Suspension Assemblies, Peltoma et al. U.S. Pat. No. 7,384,531 entitled Plated Ground Features for Integrated Lead Suspensions.

As shown by FIG. 2b, portions of the base layer 12 can be removed from the structure of flexure 8' at the portion 10' (e.g., using patterned photoresist masks and chemical etching). After the portions of the base layer 12 are removed, portions of the dielectric layer 14 at the portion 10' can be removed as shown in FIG. 2c (e.g., by laser etching through a pattern mask). Undesired portions of the seed layer 18 can then be removed as shown in FIG. 2d (e.g., by chemical etching). The strip 22 can then be formed by removing portions of the exposed edge of the dielectric layer 14 above the seed layer 18 (e.g., by atmospheric plasma etching) as shown in FIG. 2e. Following the formation of the portion 10' with strip 22, the noncorrosive layer 24 can be applied (i.e., by plating) to produce the structure shown in FIG. 1.

Manufacturing methods of these types offer important advantages. They enable the efficient fabrication of portions 10.

Although the invention has been described with reference to preferred embodiments, those of skill in the art will recognize that changes can be made in form and detail without departing from the spirit and scope of the invention. For example, other methods can be used to manufacture the portions 10 of flexure 8.

The invention claimed is:

1. A corrosion-resistant joint including:
   a portion of a dielectric layer having an edge;
   a portion of a conductor layer, the portion of the dielectric layer and the portion of the conductor layer form a joint between the dielectric layer and the conductor layer;
   a portion of a seed layer extending beyond the edge of the dielectric layer and partially between the dielectric layer and the conductor layer; and
   a noncorrosive layer on the conductor layer and extending on the portion of the seed layer and into contact with the edge of the dielectric layer.

2. The corrosion-resistant joint of claim 1, further comprising a base layer on the side of the dielectric layer opposite the seed layer.

3. The corrosion-resistant joint of claim 1, wherein the noncorrosive layer comprises gold, nickel, or any combination thereof.

4. A disk drive head suspension or flexure having a corrosion-resistant joint including:
   a dielectric layer having an edge;
   a conductor layer;
   a seed layer between the dielectric layer and the conductor layer, the seed layer having a strip that extends beyond the edge of the dielectric layer; and
   a noncorrosive layer on the seed layer side of the conductor layer, the noncorrosive layer extending over the strip of the seed layer and into contact with the edge of the dielectric layer.

5. The disk drive head suspension or flexure of claim 4 wherein the corrosion-resistant joint further includes a base layer on the side of the dielectric layer opposite the seed layer.

6. The disk drive head suspension or flexure of claim 5 having a terminal pad including the corrosion-resistant joint.

7. The disk drive head suspension or flexure of claim 4 having a terminal pad including the corrosion-resistant joint.

8. The disk drive head suspension or flexure of claim 5 having a flying lead including the corrosion-resistant joint.

9. The disk drive head suspension or flexure of claim 4 having a flying lead including the corrosion-resistant joint.

* * * * *